(12) United States Patent
Grandjean et al.

(10) Patent No.: US 12,261,463 B2
(45) Date of Patent: Mar. 25, 2025

(54) BATTERY AND BATTERY CHARGER

(71) Applicant: Illinois Tool Works Inc., Glenview, IL (US)

(72) Inventors: Pascale Grandjean, Guilherand-Granges (FR); Médéric Cartier, Etables (FR)

(73) Assignee: Illinois Tool Works Inc., Glenview, IL (US)

( * ) Notice: Subject to any disclaimer, the term of this patent is extended or adjusted under 35 U.S.C. 154(b) by 474 days.

(21) Appl. No.: 17/373,054

(22) Filed: Jul. 12, 2021

(65) Prior Publication Data

US 2022/0021226 A1  Jan. 20, 2022

(30) Foreign Application Priority Data

| Jul. 14, 2020 | (EP) | ..................................... | 20185650 |
| May 26, 2021 | (EP) | ..................................... | 21175903 |
| May 28, 2021 | (EP) | ..................................... | 21176524 |

(51) Int. Cl.
*H02J 7/00* (2006.01)
*H01M 10/6235* (2014.01)

(52) U.S. Cl.
CPC ..... *H02J 7/00041* (2020.01); *H01M 10/6235* (2015.04); *H02J 7/007182* (2020.01); *H01M 2220/30* (2013.01)

(58) Field of Classification Search
None
See application file for complete search history.

(56) References Cited

U.S. PATENT DOCUMENTS

| 5,945,803 | A |   | 8/1999  | Brotto et al. |
| 6,229,280 | B1 | * | 5/2001 | Sakoh ................. H02J 7/00047 |
|  |  |  |  | 320/114 |
| 6,357,534 | B1 |   | 3/2002 | Buetow et al. |
| 2003/0082439 | A1 | * | 5/2003 | Sakakibara ....... H01M 10/6235 |
|  |  |  |  | 429/120 |
| 2004/0113589 | A1 | * | 6/2004 | Crisp ................. H02J 7/00041 |
|  |  |  |  | 320/128 |
| 2006/0214642 | A1 | * | 9/2006 | Miyazaki .............. H02J 7/0042 |
|  |  |  |  | 320/150 |
| 2015/0288354 | A1 | * | 10/2015 | Karasawa ................ G01K 7/01 |
|  |  |  |  | 327/83 |

FOREIGN PATENT DOCUMENTS

| CN | 103 217 650 | 7/2013 |
| CN | 207 664 662 | 7/2018 |
| DE | 10 2009 036608 | 2/2011 |
| WO | WO 2008/156567 | 12/2008 |
| WO | WO 2017/166573 | 10/2017 |

OTHER PUBLICATIONS

Extended European Examination Report form European Application No. 21176524.3, mailed Oct. 29, 2021 (7 pages).

* cited by examiner

*Primary Examiner* — Arun C Williams
(74) *Attorney, Agent, or Firm* — Neal, Gerber & Eisenberg LLP

(57) ABSTRACT

A battery and a corresponding battery charger, wherein the battery charger can identify a type of the connected battery to ensure that an appropriate charging current is supplied.

6 Claims, 5 Drawing Sheets

BATTERY AND BATTERY CHARGER

PRIORITY CLAIM

This patent application claims priority to and the benefit of European Patent Application No. 20185650.7, filed Jul. 14, 2020, European Patent Application No. 21175903.0, filed May 26, 2021 and European Patent Application No. 21176524.3, filed May 28, 2021, the entire contents of each of which are incorporated herein by reference.

BACKGROUND

The present disclosure relates to a battery and a corresponding battery charger. In particular, the present disclosure relates to ways in which a battery charger can identify a type of connected battery in order to ensure that an appropriate charging current is supplied.

Battery powered tools are well known. As one example, construction tools, for instance a drill, may be powered by a battery. This avoids the need for a connection to main electricity and provides greater freedom and flexibility for the user. It is known for a battery to be removable from the tool for charging purposes. The battery may be removed from the tool and inserted into a separate battery charger that is connected to a main electricity supply. By using two batteries, one may be charged while the other is in use to enable the tool to be continuously used. Also, it may be that one battery is usable with multiple different tools. It will be appreciated that such a removable battery will be provided with some form of coupling to secure the battery to a tool (and perhaps also a battery charger) as well as battery terminals to supply electrical power to a tool and to receive electrical power from a battery charger.

A given battery will have a maximum rated charging current. It can be important to not exceed that maximum charging current in order to avoid damage to the battery, particularly for lithium-ion (Li-ion) batteries. Overcharging may be prevented by ensuring that each battery is shaped to only fit a particular battery charger (and also only fit a particular tool).

However, as battery technology develops, it becomes possible to design a battery that is the same shape and size as an existing battery, but has a larger capacity. Given that the cost of a tool may be significantly more than the cost of the battery, it may be attractive to a consumer to purchase a new battery with a larger capacity that is backwards compatible with their existing tools in order to achieve longer tool use times for a single battery charge. Additionally, from the perspective of the manufacturer, it is desirable to provide upgraded batteries in such a way that it is not necessary to redesign tools and battery chargers to receive those batteries. It is desirable to provide full compatibility across a product range so that old and new batteries may be used alike in the same tools and both may use the same battery chargers.

Where such a larger capacity battery is introduced, it is desirable to provide a new charger able to charge the new battery with a higher current than the old battery in order to not increase the charging time. But, given the older, lower capacity battery will fit the new battery charger there is a risk of providing an excessive charging current to an old battery, which may damage it.

It would be advantageous to able to identify a battery type when it is inserted into a battery charger in order to facilitate an appropriate charging current to be supplied. For an older, lower capacity battery this would prevent an excessive charging current being supplied. For a newer, higher capacity battery this would facilitate a higher charging current to be supplied, to thereby minimize charging times.

It is known that batteries, particularly Li-ion batteries, may be damaged if they are too cold when they are charged. It would therefore be advantageous to be able to ensure the batteries are not damaged when they are charged.

BRIEF SUMMARY

According to a first aspect of the present disclosure, there is provided a battery comprising: (a) positive and negative terminals for supplying electrical power or receiving a charging current; (b) a thermistor terminal; and (c) a thermistor and a capacitor connected in parallel between the thermistor terminal and one of the other terminals.

According to an aspect of the present disclosure, such a thermistor in the battery can be used to provide an indication of battery temperature. It is known that batteries, particularly Li-ion batteries, may be damaged if they are too cold when they are charged. According to an aspect of the present disclosure, thanks to the thermistor, the battery can be arranged such that the charging current is not supplied if an indication is obtained from the thermistor that the battery is too cold to be safely charged.

According to another aspect of the present disclosure, the battery comprises a mechanism to measure a temperature of the battery.

According to another aspect of the present disclosure, a thermistor can be connected in series between the thermistor terminal and the positive terminal.

According to another aspect of the present disclosure, the battery comprises a mechanism for indicating to a charger that the battery is of a first type.

According to another aspect of the present disclosure, said mechanism indicating to a charger that the battery is of a first type comprises a capacitor.

According to another aspect of the present disclosure, the thermistor and the capacitor are connected in parallel between the thermistor terminal and the negative terminal.

According to another aspect of the present disclosure, the battery is a battery for powered construction tool.

According to a second aspect of the present disclosure, there is provided a battery charger comprising: (a) positive and negative terminals for supplying charging current to a battery; (b) a thermistor contact terminal; and (c) a first portion arranged to mate with a corresponding portion of a battery to electrically connect the positive, negative and thermistor contact terminals to corresponding positive, negative and thermistor terminals of a battery; wherein the thermistor contact terminal is arranged to apply a voltage to a corresponding thermistor contact terminal of a battery; and wherein the battery charger is arranged to detect the impulse response of the corresponding thermistor contact terminal of the battery to the applied voltage, and to set a charging current according to the detected impulse response.

According to an aspect of the present disclosure, the battery charger is configured to detect mating of the first portion with the corresponding portion of a battery and to apply the voltage to the corresponding thermistor contact terminal of a battery only after the battery is mated.

According to an aspect of the present disclosure, mating of the first portion with the corresponding portion of a battery is detected by detecting a voltage on the positive terminal.

According to an aspect of the present disclosure, the battery charger further comprises a mechanism to disconnect the thermistor power supply for a predetermined period of time.

According to an aspect of the present disclosure, such mechanism to disconnect the thermistor power supply for a predetermined period of time can allow to remove or minimize the terminal bounce effect—that is momentary disconnection and reconnection of the terminals between the battery and the battery charger, which could disrupt the impulse response.

According to an aspect of the present disclosure, the mechanism to disconnect the thermistor comprise a MOSFET and a resistor.

According to an aspect of the present disclosure, the battery is a battery for powered construction tool.

According to a third aspect of the present disclosure, there is provided a battery charger comprising: (a) positive and negative terminals for supplying charging current to a battery; (b) a thermistor contact terminal; and (c) a first portion arranged to mate with a corresponding portion of a battery to electrically connect the positive, negative and thermistor contact terminals to corresponding positive, negative and thermistor terminals of a battery; wherein the thermistor contact terminal is arranged to apply a voltage to a corresponding thermistor contact terminal of a battery; and wherein the battery charger is arranged to detect the impulse response of the corresponding thermistor contact terminal of the battery to the applied voltage, and to set a charging current according to the detected impulse response.

Advantageously, according to examples of the present disclosure, a battery charger can be able to identify different types of battery according to the impulse response when a voltage is applied by a battery charger to a terminal of a battery.

According to another aspect of the present disclosure, there is provided a battery comprising: (a) positive and negative terminals for supplying electrical power or receiving a charging current; and (b) a battery type terminal configured to make contact with a corresponding battery type detection terminal of a battery charger such that the battery charger can detect a voltage upon the battery type terminal indicating that the battery is of a first type.

According to an aspect of the present disclosure, there is provided, a solution to identify a battery type when it is inserted into a battery charger in order to facilitate an appropriate charging current to be supplied. As an example, for an older, lower capacity battery, this can prevent an excessive charging current being supplied. For a newer, higher capacity battery, this can allow a higher charging current to be supplied, to thereby minimize charging times.

According to an aspect of the present disclosure, the battery further comprises a housing including a first portion arranged to mate with a corresponding portion of a battery charger to electrically connect the positive and negative terminals and the battery type terminal to corresponding terminals of the battery charger.

According to an aspect of the present disclosure, the battery type terminal is electrically connected to the positive or the negative terminal.

According to an aspect of the present disclosure, the battery type terminal is formed in one piece with any of the positive or the negative terminal.

According to another aspect of the present disclosure, the battery type terminal can be formed in one piece with the negative terminal.

According to an aspect of the present disclosure, the battery type terminal is exposed in a recessed portion of a housing or is flush with adjacent portions of the housing.

According to an aspect of the present disclosure, the battery is a battery for powered construction tool.

According to a fourth aspect of the present disclosure, there is provided a battery charger comprising: (a) positive and negative terminals for supplying charging current to a battery; (b) a first portion arranged to mate with a corresponding portion of a battery to electrically connect the positive and negative terminals to corresponding terminals of the battery; and (c) a battery type detection terminal arranged to detect the presence or absence of a voltage when the first portion of the battery charger is mated with a corresponding portion of a battery; wherein the presence or absence of a voltage detected by the battery type detection terminal indicates whether the battery is of a first or second type.

Advantageously, according to a first example of the present disclosure, a battery charger can be able to identify different types of battery that are substantially the same dimensions by detecting the presence or absence of a terminal on the battery. For example, a first (for instance, new) type of battery can include an additional terminal that is detectable by a battery charger including a corresponding terminal. A second (for instance, old) type of battery, that is substantially the same dimensions, at least at the interface with the battery charger, can be differentiated by the absence of the additional terminal. That is, the presence or absence of a voltage detected by the corresponding terminal of the battery charger indicates whether the connected battery is of the first type or the second type respectively. This can be used to determine which of two different charging currents are to be supplied by the battery charger.

According to an aspect of the present disclosure, the battery type detection terminal is configured to contact a corresponding battery type terminal of a battery if the battery is of the first type.

According to an aspect of the present disclosure, the battery type detection terminal is further configured to supply either a first or a second charging current to a mated battery according to the presence or absence of a voltage detected by the battery type detection terminal.

According to an aspect of the present disclosure, the battery type detection terminal comprises a sprung electrical contact such that if a first type of battery is inserted it will make electrical contact with the battery type terminal.

According to an aspect of the present disclosure, if the second type of battery is inserted the battery type detection terminal is deformed out of the way by said battery.

According to an aspect of the present disclosure, the battery is a battery for powered construction tool.

According to another aspect of the present disclosure, there is provided a battery charger comprising: (a) positive and negative terminals for supplying charging current to a battery; (b) a first portion arranged to mate with a corresponding portion of a battery to electrically connect the positive and negative terminals to corresponding terminals of the battery; and (c) a battery type detection terminal arranged to detect the presence or absence of a voltage when the first portion of the battery charger is mated with a corresponding portion of a battery; wherein the presence or absence of a voltage detected by the battery type detection terminal indicates whether the battery is of a first or second type.

For the avoidance of doubt, any of the features described herein apply equally to any aspect of the present disclosure.

BRIEF DESCRIPTION OF THE DRAWINGS

Embodiments of the present disclosure are further described hereinafter with reference to the accompanying drawings, in which.

In the drawings like reference numerals refer to like parts.

DETAILED DESCRIPTION

Figure 1:
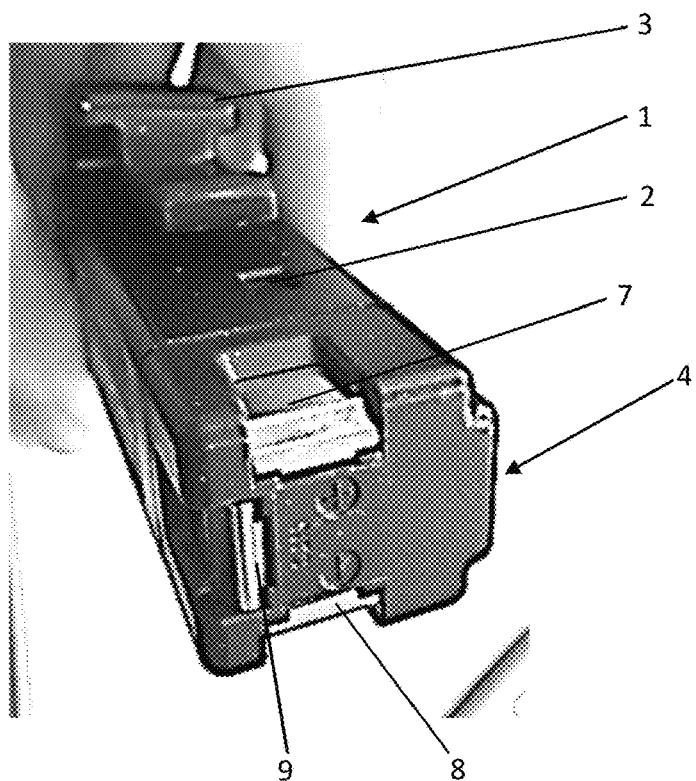
FIG. 1 illustrates a battery including three terminals.

Referring first to FIG. 1, this illustrates a known form of battery 1 (referred to herein as a second type of battery) suitable for use in a power tool. The second type of battery can comprise an older or legacy battery type. The battery 1 comprises a housing 2 containing at least one battery cell (not visible). The housing 2 includes at least one coupling portion 3 for securing the battery 1 when the battery is connected to a power tool. The details of the coupling portion 3 are outside of the scope of the present disclosure.

Figure 2:
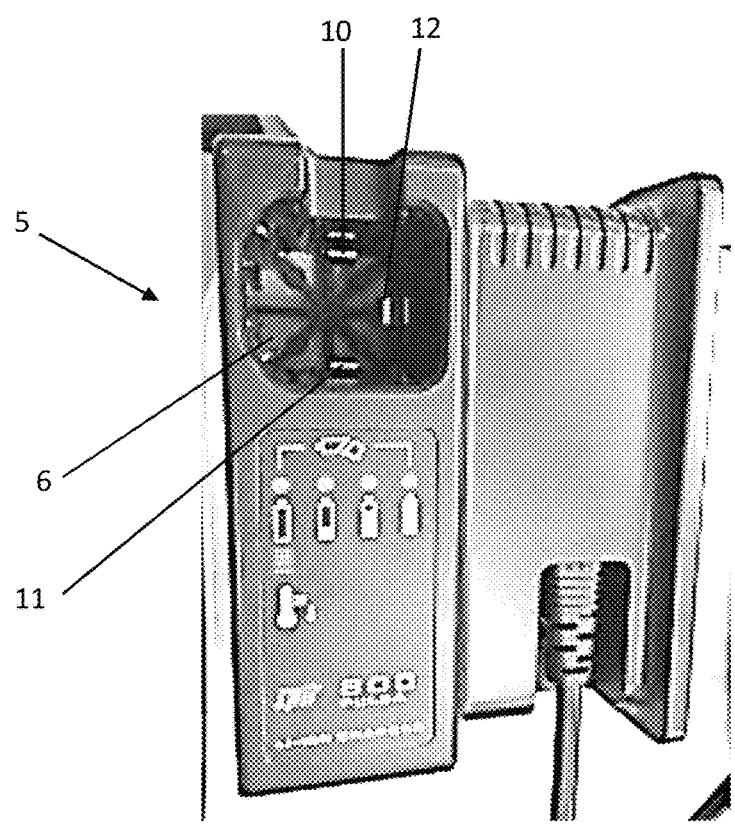
FIG. 2 illustrates a battery charger for charging the battery of FIG. 1.

Battery 1, and particularly the housing 2, further comprises a first portion generally indicated by reference 4 for mating with either a power tool or a charger 5 (such as illustrated in FIG. 2). In the example of FIGS. 1 and 2, the battery 1 comprises a first portion 4 and the charger 5 comprises a second portion or socket 6 configured to receive the first portion 4 of the battery 1, though in other examples this can be reversed or any other arrangement can be used. The respective shapes of the battery 1 and the charger 5 (and also a power tool, not illustrated) ensure that electrical terminals are correctly aligned.

Battery 1, and particularly the first portion 4, comprises three electrical terminals including positive and negative terminals 7 and 8, respectively, and a thermistor terminal 9. The positive and negative terminals 7 and 8 are for supplying electrical power from a battery cell to a power tool or receiving a charging current from the battery charger 5, and their functions can be entirely conventional and so will not be further described. The thermistor terminal 9 is described in greater detail below in connection with FIGS. 5 and 6. However, it should be understood that the thermistor terminal 9 may not be required in all embodiments of the present disclosure, and in particular it can an optional feature for the batteries illustrated in FIGS. 1 to 4 and in particular for the battery illustrated in FIG. 3.

Charger 5 comprises corresponding positive and negative terminals 10 and 11, and a thermistor contact terminal 12 respectively configured to make contact with the battery terminals 7, 8, and 9 when the battery 1 is mated with the charger 5. As illustrated, the charger terminals 10, 11, and 12 can comprise sprung electrical terminals to ensure a stable electrical connection.

Figure 3:
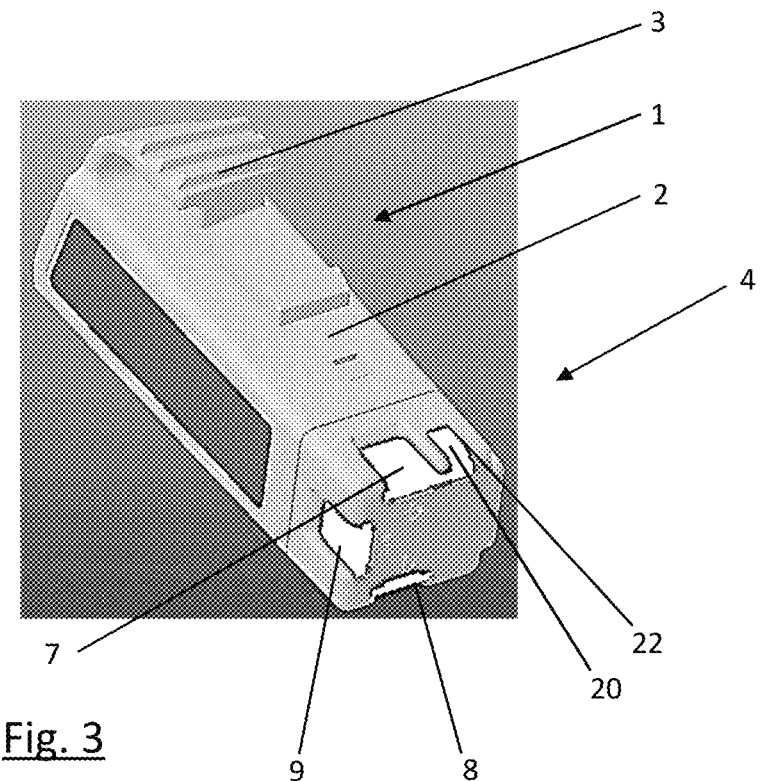
FIG. 3 illustrates a battery including an additional battery type terminal.
Figure 4:
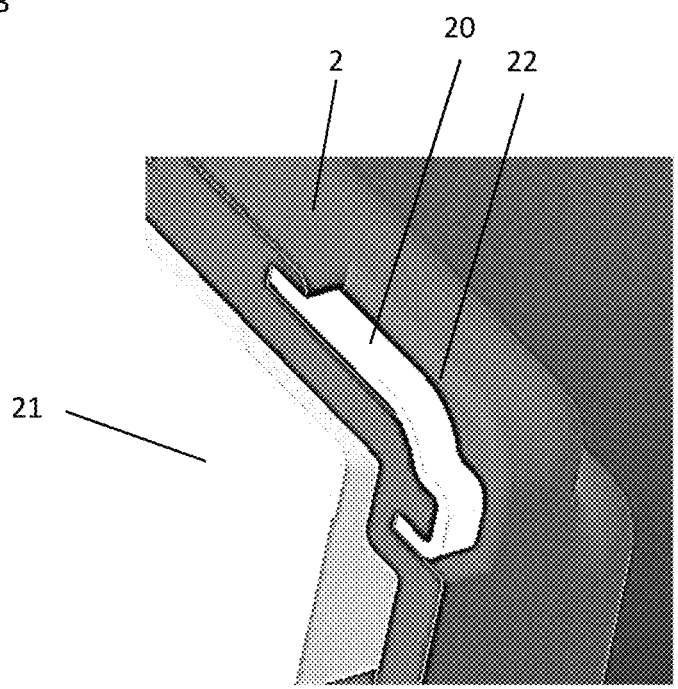
FIG. 4 illustrates a cut away perspective view of the battery of FIG. 3.

Turning now to FIGS. 3 and 4, these Figures illustrate a first type of battery 1 including an additional battery type terminal 20 according to an example embodiment of the present disclosure. The first type of battery can comprise an upgraded, newer type of battery with a larger capacity and able to be charged with a larger charging current. FIG. 4 is a partial cross-sectional view of FIG. 3 through the battery type terminal 20, and reveals also the internal battery cell or cells 21. Where features of the battery of FIGS. 3 and 4 correspond to those of the battery of FIG. 1, the same reference numbers are used and they should be assumed to be the same unless indicated otherwise. The first type of battery of FIGS. 3 and 4 is a higher capacity battery.

However, it should be understood that the battery type terminal 20 may not be required in all examples of the present disclosure, in particular it can be an optional feature for the batteries illustrated in FIGS. 1 to 4 and in particular for the battery illustrated in FIG. 3.

It can be seen that the battery type terminal 20 is formed in one piece with the positive terminal 7. According to another aspect of the present disclosure, the battery type terminal 20 can be formed in one piece with the negative terminal. For instance, both can be formed from a single metal component and so the voltage upon the positive terminal 7 and the battery type terminal 20 will be the same. FIG. 4 illustrates how the battery type terminal 20 is keyed into the housing 2. Battery type terminal 20 is exposed by a recess 22 formed in the housing 2. The outside shape and dimensions of the respective batteries in FIGS. 1 and 3 can be identical except that the battery of FIG. 3 further includes a recess 22 and battery type terminal 20.

The purpose of the battery type terminal 20 is to indicate the type of the battery to a new type of battery charger. As discussed above, it can be that the same overall shape and form of battery can be used to provide two different types of battery, differentiated externally only by whether or not there is a battery type terminal 20. In particular, the battery of FIGS. 3 and 4 are a first type of battery corresponding to a higher capacity battery, which provides a longer battery life for a given use relative to a second type of battery corresponding to FIG. 1. In order to minimize charging time for the first type of battery, a battery charger can be configured to supply a higher charging current.

It will be appreciated that both the first type of battery of FIG. 3 and the second type of battery of FIG. 1 can be charged using the battery charger of FIG. 2. Because the battery type terminal 20 is formed in recess 22, which is not present on the second type of battery of FIG. 1, the first portion 4 of the battery 1 of FIG. 3 will mate with the battery charger of FIG. 2 in exactly the same way, and the same charging current will be supplied to both batteries. That is, while the first, newer type of battery of FIGS. 3 and 4 can be charged with a higher charging current, it can also be charged with the lower charging current provided by the battery charger of FIG. 2.

In accordance with an example of the present disclosure, a new form of battery charger is provided, generally identical to that of FIG. 2, except that within socket 6 there is provided a further terminal—a battery type detection terminal—configured to contact the battery type terminal if one is present. Suitably, the battery type detection terminal can also comprise a sprung electrical contact such that if a first type of battery is inserted it will make electrical contact with the battery type terminal 20, and if the second type of battery is inserted it will deformed out of the way by the battery housing (given the absence of a recess on the second type of battery).

However, it should be understood that the battery type detection terminal may not be required in all examples of the present disclosure, in particular it can be an optional feature for the chargers described in relation to the present disclosure.

As the battery type terminal is connected to the positive terminal, if the battery type detection terminal of a charger makes electrical contact with a battery type terminal, it will detect a positive voltage. This indicates that the battery is of the first type—a higher capacity battery—and a higher charging current can be supplied. If no voltage is detected by the battery type detection terminal then this indicates that a second, lower capacity type of battery has been inserted and so a lower charging current is supplied. Alternatively, the battery type terminal could be separated from the positive terminal and connected instead to a reference voltage internally generated within the battery.

Referring now to FIGS. 5 to 9, another example way of detecting battery type and setting a charging current will now be described. This makes use of an additional capacitor within the battery between the thermistor terminal 9 and the negative terminal 8 for a higher capacity battery. The exterior form of the battery 1 can be that of FIG. 1 or FIG. 3, though it will be appreciated that the battery type terminal is not essential if an internal capacitor is used to detect the battery type. Advantageously, this means that the same housing can be used for the battery and the battery charger, with the same arrangement of terminals, with the battery type being detectable through internal changes to the circuits of the battery and the battery charger.

Figure 5:
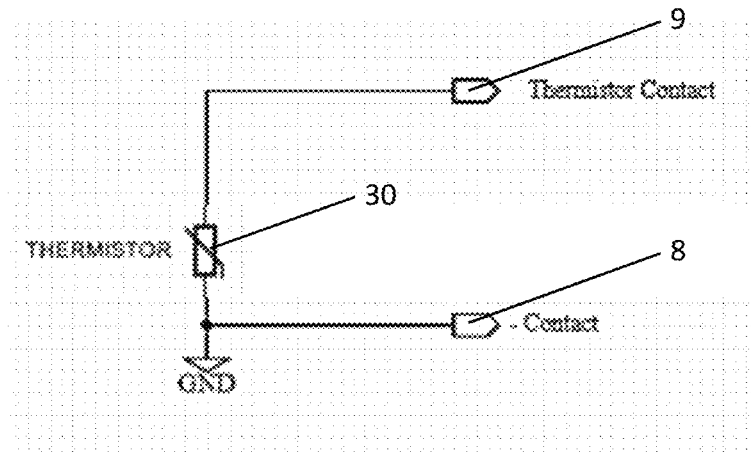
FIG. 5 is a partial circuit diagram for the battery of FIG. 1.
Figure 6:
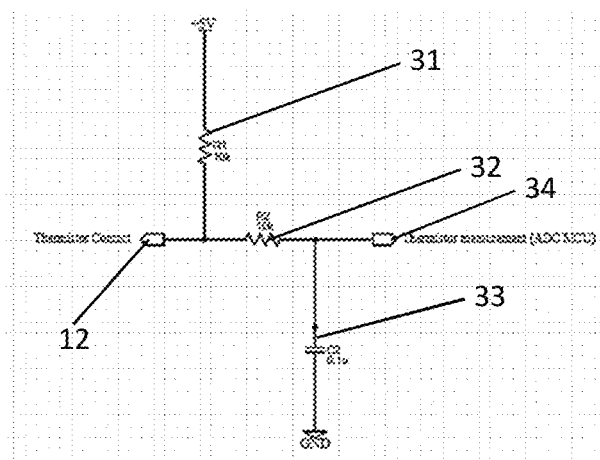
FIG. 6 is a partial circuit diagram for the battery charger of FIG. 2.

Turning first to FIGS. 5 and 6, the known use of a thermistor terminal will now be described. FIG. 5 illustrates the internal circuit of a known battery, such as that of FIG. 1. A thermistor 30 is connected in series between the thermistor terminal 9 and the negative terminal 8. According to another aspect of the present disclosure, a thermistor can be connected in series between the thermistor terminal 9 and the positive terminal. When connected to a battery charger, such as the battery charger of FIG. 3, the negative terminal 8 can be grounded as indicated.

FIG. 6 illustrates a portion the internal circuit of a known battery charger 5, such as that of FIG. 2. The circuit of FIG. 6 applies a voltage to the thermistor terminal 9 of battery 1 through the thermistor contact terminal 12 of the battery charger 5. Resistors 31 and 32 and capacitor 33 are connected in series between a fixed voltage, for instance +5 V and ground. The thermistor contact terminal 12 is between resistors 31 and 32 and a thermistor measurement input 34 to an analog to digital converter within a microprocessor (not illustrated) is between resistor 32 and capacitor 33. Capacitor 33 serves to filter measurements of the voltage across the thermistor.

The purpose of thermistor 30 in battery 1 is to provide an indication of battery temperature. It is known that batteries, particularly Li-ion batteries, may be damaged if they are too cold when they are charged. When a battery is connected to a battery charger the circuit of FIG. 6 causes a current to be drawn by the thermistor 30 through the thermistor terminal 9. The resistance of the thermistor 30 is dependent on temperature. The voltage across the thermistor 30 has an impulse response when the thermistor terminals 9, 12 are connected due to the thermistor being connected to the +5 V supply in series with resistor 31, but will settle to a stable level. That stabilised voltage level is measured by the microprocessor through the thermistor measurement input 34. The microprocessor is arranged to control the charging current to the battery such that the charging current is not supplied if the stable thermistor voltage indicates that the battery is too cold to be safely charged.

The voltage supply (+5 V) can be permanently connected to the thermistor contact terminal 12 as no current will flow unless or until battery 1, and hence thermistor 30, is connected. Before battery connection, the voltage measured by the thermistor measurement input 34 will be 0 V. A change from this indicates that a battery has been connected to the battery charger and can be used to control other parts of the battery charger. Insertion of a battery can also be detected by a change of voltage on the positive battery charger terminal 10.

The voltage across the thermistor 30 can also be used to detect an overheating battery and so disable the charging current. Other than that, the charging current can be disabled and the battery considered to be fully charged when the current drawn by a charging battery through positive and negative battery charger terminals 10, 11 drops below a threshold.

According to an example of the present disclosure, in addition to the use of the thermistor terminal 12 in the battery charger to detect battery temperature, it can also be used to detect which type of battery has been connected, as will now be described in connection with FIGS. 7 to 9.

Figure 7:
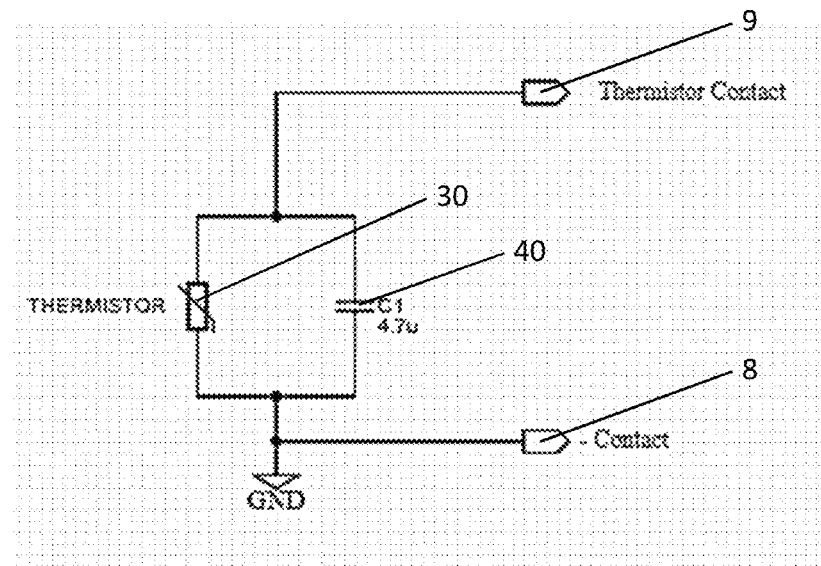
FIG. 7 is a partial circuit diagram for the battery of FIG. 3.

FIG. 7 illustrates the internal circuit of a new type of battery having an increased capacity and able to accept a higher charging current to reduce the charging time. Externally, the new type of battery can be identical to that of FIG. 1. Internally, it differs by the inclusion of a capacitor 40 coupled in parallel with the thermistor 30 between the thermistor terminal 9 and the negative terminal 8. In other respects, the circuit is unchanged from that of FIG. 5. The stabilised voltage level continues to be measured by the microprocessor through the thermistor measurement input 34 such that the microprocessor can control the charging current to the battery to disconnect the charging current if the battery is too cold.

However, the impulse response across the thermistor when the thermistor terminal 9 and the thermistor contact terminal 12 of the battery charger are connected differs due to the presence of the capacitor 40. In accordance with an example of the disclosure, the microprocessor through the thermistor measurement input 34 of a modified battery charger is arranged to detect the difference between the impulse response of an old battery and a new, higher capacity battery. That is, the microprocessor is arranged to detect the presence of capacitor 40 in parallel with the thermistor 30, and adjust the size of the charging current accordingly. It will be appreciated that where a battery including a capacitor 40 is inserted into a legacy battery charger that is unable to adjust its charging current, then it will be charged with a charging current lower than the maximum available.

Figure 8:
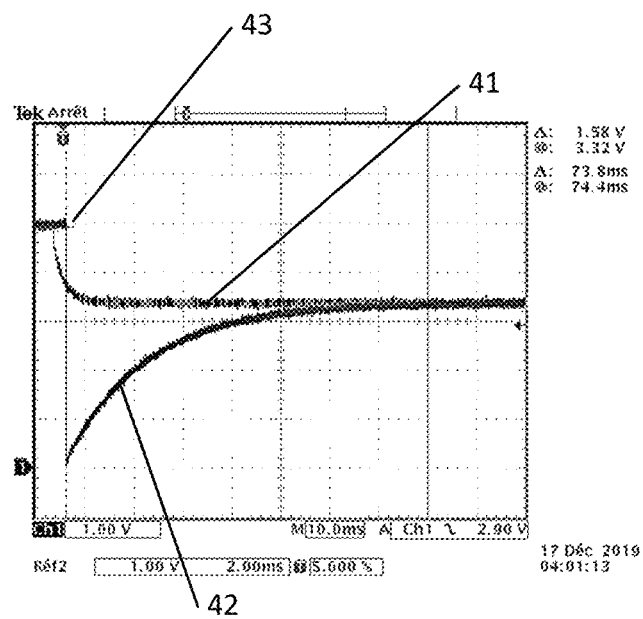
FIG. 8 is a graph showing the respective impulse response for the batteries of FIGS. 1 and 3.

Referring to FIG. 8, the respective impulse response for the voltage across the thermistor is displayed for the older battery (line 41) and for the newer battery including the capacitor (line 42). The X axis is time, with the increments being 10 ms. The Y axis is measured voltage with the increments being 1 V. The battery insertion time (when the thermistor terminals are connected) is indicated at point 43). It can be seen that the impulse responses initially are completely different due to the effect of capacitor 40, before the thermistor voltage stabilises to the same value. This impulse response before voltage stabilization can be measured and used to determine whether a capacitor 40 is present. If the capacitor is present then this can be used to determine that a higher charging current can be used to reduce the charging time.

It will be appreciated that the same circuit as FIG. 6 can be used to measure the impulse response as well as the stabilised thermistor voltage. To implement this example of the present disclosure for battery identification requires only that the microprocessor is additionally programmed to measure or identify the different types of impulse response for different batteries. Identification of the impulse response can comprise, when a battery is detected, sampling the thermistor voltage until the voltage is stabilized. The known thermistor resistance (from the stabilized voltage and a potential divider with resistor 31) and the time constant to charge the capacitor 40 from 0 V to the stabilized voltage (or 95% of the stabilized voltage, as discussed below in connection with Table 1) enables the capacitance of capacitor 40 to be calculated. The value of the capacitor identifies the battery.

As a further extension, beyond simply detecting the presence or absence of a capacitor, as it is possible to calculate the capacitance of capacitor 40 this allows different capacitors to be used to identify multiple different types of battery, each having a different maximum acceptable charging current. This enables further evolution of batteries as storage capacitor and maximum charging current increase over time, while allowing the same battery housing to be used and while ensuring backwards compatibility with legacy battery chargers.

To ensure the compatibility of the new battery with the current charger (FIG. 6), the minimum capacitor value is defined depending on the first sample measured by the current charger and on its measurement filtering through capacitor 33. Table 1, below, provides an example for two different sizes of capacitor 40 applied in parallel to the thermistor 30: 4.7 µF and 10 µF, and the corresponding time constant for the voltage to stabilise to 95% of its stable value. Table 1 shows the respective time constant, thermistor value, stabilised thermistor voltage and 95% of the stabilised thermistor value. Table 1 reveals that for each different size of capacitor 40, and for each temperature, the time constant for the thermistor to reach 95% of its stabilised value remains within an acceptable period of time (a maximum of 276 ms). It will be appreciated that this is further extensible beyond there being two different capacitance values (and the absence of capacitor 40) for identifying different battery types.

TABLE 1

| | | | | Time (ms) 95% | |
|---|---|---|---|---|---|
| T ° (° C.) | RTh (Ω) | Th voltage | 95% Th voltage | Capacitor 4.7 µF | Capacitor 10 µF |
| 25 | 10,000 | 2.500 | 2.375 | 73 | 149 |
| −30° | 118,500 | 4.611 | 4.380 | 132 | 276 |
| +80° | 1,668 | 0.715 | 0.679 | 23 | 45 |

During insertion of a battery into a battery charger, terminal bounce—that is momentary disconnection and reconnection of the terminals between the battery and the battery charger—may occur, which could disrupt the impulse response. To overcome this, in accordance with a further example of the present disclosure the thermistor power supply (VCC=+5 V) can be disconnected and then reconnected after battery insertion is detected, before sampling the impulse response and the stabilized thermistor voltage as described above. An example modification to the battery charger circuit of FIG. 6 for implementing this is illustrated in FIG. 9.

Figure 9:
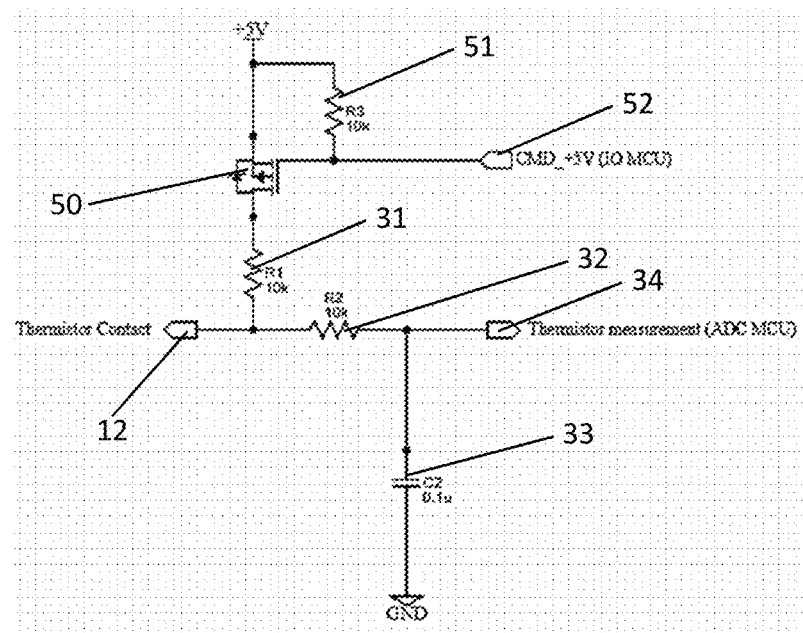
FIG. 9 is a partial circuit diagram for a battery charger according to an example of the present disclosure able to detect whether a connected battery corresponds to FIG. 1 or FIG. 3.

The battery charger circuit of FIG. 9 differs from that of FIG. 6 by the inclusion of MOSFET 50, resistor 51 and an additional control output 52 from the microprocessor. Upon detection of battery insertion, through detection of a change in the thermistor measurement value at microprocessor input 34, the microcontroller controls the MOSFET 50 to disconnect the thermistor power supply for a predetermined period of time. A suitable period of time will be selected to avoid or minimize the effect of bounce.

It will be clear to a person skilled in the art that features described in relation to any of the embodiments described above can be applicable interchangeably between the different embodiments. The embodiments described above are examples to illustrate various features of the invention.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be appreciated by those skilled in the art that several variations to the aforementioned embodiments are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

The invention claimed is:

1. A battery charger comprising:
   positive and negative terminals positioned to supply a first charging current or a second charging current to a battery attachable to the battery charger;
   a thermistor contact terminal; and
   a first portion arranged to mate with a corresponding portion of the battery to electrically connect the positive, negative, and thermistor contact terminals to corresponding positive, negative and thermistor terminals of the battery;
      wherein the thermistor contact terminal is arranged to apply a voltage to a corresponding thermistor contact terminal of the battery;
      wherein the battery charger is arranged to detect the impulse response of the corresponding thermistor contact terminal of the battery to the applied voltage, and to supply
         (i) the first charging current when the impulse response indicates a first battery type; and (ii) the second charging current when the impulse response indicates a second battery type; and wherein the first charging current is greater than the second charging current and the second charging current is greater than zero.

2. The battery charger of claim 1, which is configured to detect mating of the first portion with the corresponding portion of the battery and to apply the voltage to the corresponding thermistor contact terminal of the battery only after the battery is mated.

3. The battery charger of claim 2, wherein mating of the first portion with the corresponding portion of a battery is detectable by detecting a voltage on the positive terminal.

4. The battery charger of claim 2, which comprises means for disconnecting the thermistor power supply for a predetermined period of time.

5. The battery charger of claim 4, wherein the disconnecting means comprises a MOSFET and a resistor.

6. A tool power system comprising:

a battery including positive and negative terminals configured to supply electrical power or receive a charging current, a thermistor terminal, and a thermistor and a capacitor connected in parallel between the thermistor terminal and one of the other terminals; and a battery charger including positive and negative terminals positioned to supply a first charging current or a second charging current to the battery, a thermistor contact terminal, and a first portion arranged to mate with a corresponding portion of the battery to electrically connect the positive, negative, and thermistor contact terminals to corresponding positive, negative and thermistor terminals of the battery, wherein the thermistor contact terminal is arranged to apply a voltage to a corresponding thermistor contact terminal of the battery, and wherein the battery charger is arranged to detect the impulse response of the corresponding thermistor contact terminal of the battery to the applied voltage, and to supply (i) the first charging current when the impulse response indicates a first battery type; and (ii) the second charging current when the impulse response indicates a second battery type; and wherein the first charging current is greater than the second charging current and the second charging current is greater than zero.

\* \* \* \* \*